United States Patent [19]
Iwanaga

[11] Patent Number: 5,839,661
[45] Date of Patent: Nov. 24, 1998

[54] SOLENOID VALVE AND FUEL INJECTOR FOR INTERNAL COMBUSTION ENGINE USING THE SAME

[75] Inventor: Takashi Iwanaga, Toyohashi, Japan

[73] Assignee: Denso Corporation, Japan

[21] Appl. No.: 759,632

[22] Filed: Dec. 5, 1996

[30] Foreign Application Priority Data

Dec. 5, 1995 [JP] Japan ..................................... 7-316370

[51] Int. Cl.⁶ ..................................................... F02M 47/02
[52] U.S. Cl. ........................... 239/88; 239/96; 239/533.8; 251/36; 251/129.07; 251/129.16
[58] Field of Search .................................. 239/88, 89, 96, 239/533.2, 533.8, 533.9, 585.3; 251/36, 47, 129.07, 129.16

[56] References Cited

U.S. PATENT DOCUMENTS

| 4,856,713 | 8/1989 | Burnett | 239/533.2 X |
| 5,094,215 | 3/1992 | Gustafson | 239/96 X |
| 5,125,575 | 6/1992 | Iwanaga . | |
| 5,671,715 | 9/1997 | Tsuzuki | 239/96 X |

FOREIGN PATENT DOCUMENTS

2-294554   12/1990   Japan .

Primary Examiner—Andres Kashnikow
Assistant Examiner—Steven J. Ganey
Attorney, Agent, or Firm—Cushman Darby & Cushman Intellectual Property Group of Pillsbury Madison & Sutro, LLP

[57] ABSTRACT

A rapid-response solenoid-operated fuel injector for diesel engines is provided which includes a solenoid-operated valve member and a needle valve. The solenoid-operated valve member selectively establishes fluid communication between a fuel inlet and a fuel outlet. The needle valve is moved to selectively open and close a spray hole through which the fuel is sprayed. The solenoid-operated valve member is exposed at its head to the fuel pressure within a pressure control chamber supplied from the fuel inlet and has formed therein a pressure balancing chamber communicating with the pressure control chamber through a first orifice. The pressure of fuel within the pressure balancing chamber acting on the solenoid-operated valve member to block the fluid communication between the fuel inlet and outlet is balanced with the pressure of fuel within the pressure control chamber acting on the solenoid-operated valve member to establish the fluid communication between the fuel inlet and outlet. The pressure control chamber communicates with the fuel inlet through a second orifice which is smaller in diameter than the first orifice.

4 Claims, 10 Drawing Sheets

SOLENOID VALVE AND FUEL INJECTOR FOR INTERNAL COMBUSTION ENGINE USING THE SAME

BACKGROUND OF THE INVENTION

1. Technical Field

The present invention relates generally to a solenoid valve and a fuel injector for internal combustion engines using the same, and more particularly to a fuel injector using a solenoid valve which exhibits quick response even in a small fuel injection quantity control.

2. Background of Related Art

Figure 1:
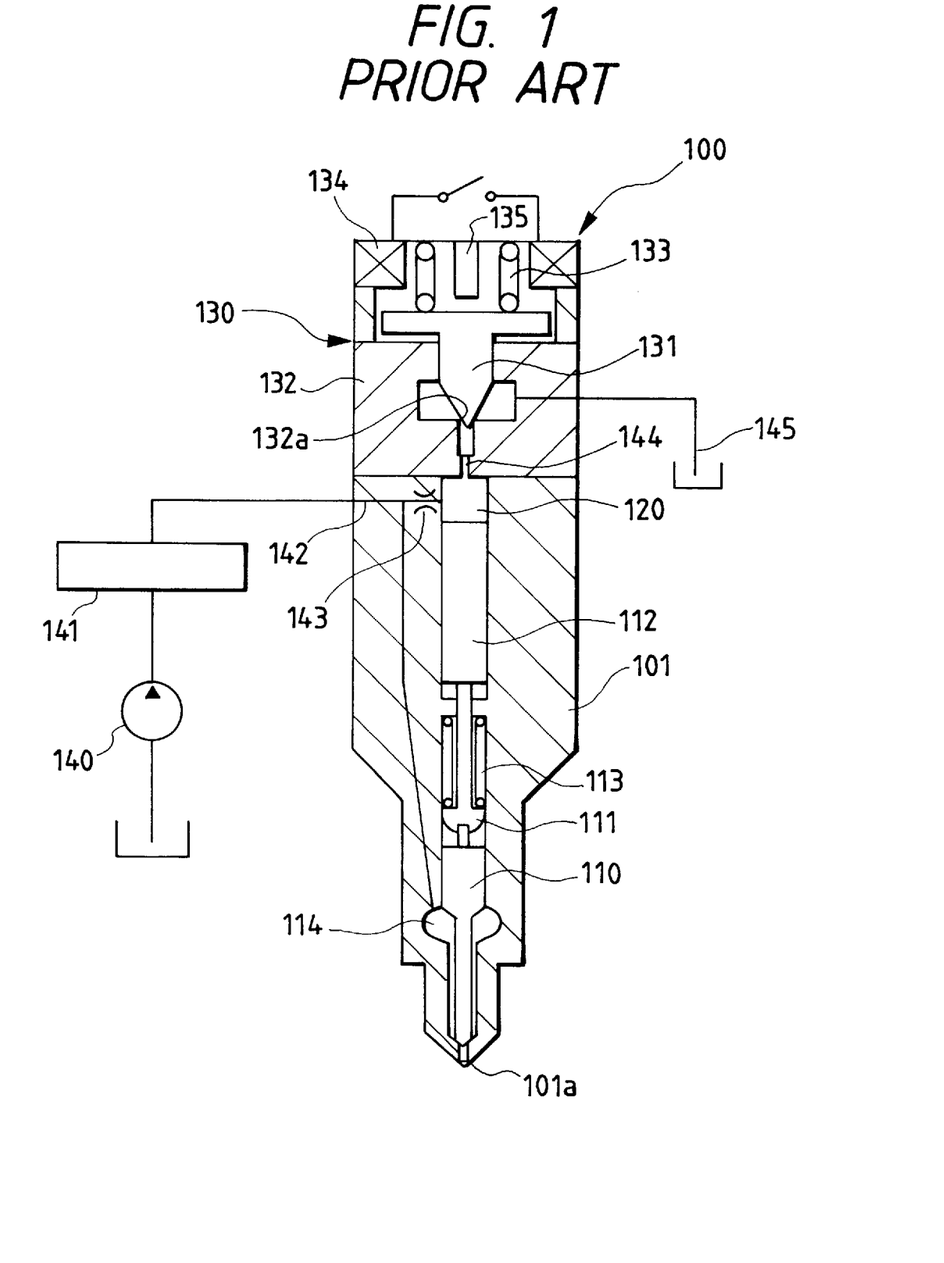
FIG. 1 is a cross-sectional view which shows a conventional solenoid-operated fuel injection system.

FIG. 1 shows a conventional accumulator fuel injection system which is designed to change the pressure in a pressure control chamber through a solenoid valve to adjust movement of a needle valve of a fuel injector for controlling fuel injection timing.

The shown fuel injector 100 includes the body 101 having disposed therein the needle valve 110, the pressure pin 111, and the control piston 112. The spring 113 urges the needle valve 110 to close the spray hole 101a. The pressurized fuel provided from the fuel pump 140 is accumulated within an accumulator chamber in the common rail 141 and then supplied to the fuel reservoir 114 through the fuel supply passage 142. The pressure control chamber 120 is defined within the body 101 to which an end of the control piston 112 is exposed. The pressurized fuel is also supplied to the pressure control chamber 120 from the fuel supply passage 142 through the orifice 143. When the solenoid valve 130 is opened, the fuel within the pressure control chamber 120 flows to the fuel return passage 145 through the flow restricting passage 144.

The solenoid valve 130 is installed on an upper end of the body 110 which selectively establishes and blocks fluid communication between the pressure control chamber 120 and the fuel return passage 145. The solenoid valve 130 includes the valve body 132, the valve 131, the spring 133, and the solenoid 134. The valve 131 is disposed slidably within the valve body 132 and urged downward by the spring 133 into constant engagement with the valve seat 132a.

When the solenoid 134 is deenergized, the valve 131 is urged by the spring 133 into engagement with the valve seat 132a to block the fluid communication between the pressure control chamber 120 and the fuel return passage 145. This holds the fuel in the pressure control chamber 120 at a higher level, thereby causing both the force produced by the fuel pressure within the pressure control chamber 120 urging the control piston 112 downward and the spring force of the spring 113 to act on the needle valve 110 to close the spray hole 101a.

When the solenoid 134 is energized, it produces the magnetic force attracting the valve 131 out of engagement with the valve seat 132a. Upon reaching the stopper 135, the valve 131 is stopped, and the fuel within the pressure control chamber 120 flows to the fuel return passage 145 so that the fuel pressure in the pressure control chamber 120 is decreased. This causes the force produced by the fuel pressure within the fuel reservoir 114 acting on the needle valve 110 upward to become greater than the force acting on the needle valve downward so that the needle valve 110 is lifted up to open the spray hole 101a.

However, the above conventional fuel injection system has the following drawbacks. When the valve 131 of the solenoid valve 130 is seated on the valve seat 132a, the force that is the product of an area of a portion of the valve 131 seated on the valve seat 132a and the fuel pressure acts on the valve 131 in a lifting direction (i.e., a valve-opening direction). Thus, in order to bring the valve 131 into engagement with the valve seat 132a against that force, it is necessary to increase the spring force of the spring 133, thus resulting in an increase in size of the spring 133. The increase in size of the spring 133 also requires increase in size of the solenoid 134 for attracting the valve 131 against the increased spring force of the spring 133.

When the solenoid 134 is deenergized, the force urging the valve 131 in the downward direction (i.e., a valve-closing direction) is produced practically only by the spring 134. Thus, a residual magnetic flux remaining in the solenoid valve 130 after the solenoid 134 is deenergized acts on the valve 131 to lift it upward, resulting in reduction in response of the solenoid valve 130 when closing it. Particularly, when quick response of the needle valve 110 or the valve 131 of the solenoid 130, especially rapid operation of the solenoid 130 to move the valve 131 in the valve closing direction is required for controlling a small amount of fuel spray, for example, the spring force of the spring 131 must be increased for closing the valve 131 against the residual magnetic flux. This requires increase in attracting force of the solenoid 134 attracting the valve 131 against the increased spring force of the spring 131, thereby resulting in a further increase in size of the solenoid valve 130.

SUMMARY OF THE INVENTION

It is therefore a principal object of the present invention to avoid the disadvantages of the prior art.

It is another object of the present invention to provide a compact solenoid valve exhibiting rapid response to cyclic on and off operations of a solenoid at short time intervals.

It is a further object of the invention to provide a fuel injection system exhibiting rapid response to requirements for starting and terminating fuel injection in controlling a small amount of fuel spray.

According to one aspect of the present invention, there is provided a solenoid-operated valve apparatus which comprises: (a) a valve body; (b) a valve seat formed within the valve body through which a fluid passage communicating between a high-pressure fluid inlet and a low-pressure fluid outlet extends; (c) a valve member disposed within the valve body movable in a given direction, the valve member having a valve head which selectively engages and disengages the valve seat according to movement of the valve member in the given direction to establish and block fluid communication between the high-pressure fluid inlet and the low-pressure fluid outlet, the valve member having formed therein a chamber; (d) a sliding member disposed within the chamber of the valve member slidably in the given direction to define a pressure balancing chamber; (e) an urging means for urging the valve member into constant engagement of the valve head with the valve seat; (f) a solenoid-operated mechanism urging the valve member out of engagement of the valve head with the valve seat against an urging force produced by the urging means to establish the fluid communication between the high-pressure fluid inlet and the low-pressure fluid outlet; (g) a flow restricting passage formed within the valve head, the flow restricting passage constantly communicating between the pressure balancing chamber and the high-pressure fluid inlet and also communicating between the pressure balancing chamber and the low-pressure fluid outlet when the valve head of the valve member is brought into disengagement from the valve seat;

(h) a first pressure-energized surface formed on the valve head of the valve member on which fluid pressure produced by fluid flowing from the high-pressure fluid inlet acts to produce a first force urging the valve head of the valve member into disengagement from the valve seat; and (i) a second pressure-energized surface formed in the valve member on which fluid pressure within the pressure balancing chamber acts to produce a second force urging the valve head of the valve member into engagement with the valve seat, the second force being substantially equal to the first force.

In the preferred mode of the invention, a fluid spraying body is further provided which has a spray nozzle communicating with the high-pressure fluid inlet. The fluid spraying body has formed therein a recessed portion. The valve body engages the recessed portion of the fluid spraying body.

The valve body may alternatively have formed therein a recessed portion into which a portion of the fluid spraying body is inserted in engagement therewith.

According to another aspect of the present invention, there is provided a fuel injector which comprises: (1) a solenoid-operated valve including (a) a valve body, (b) a valve seat formed within the valve body through which a fluid passage communicating between a high-pressure fuel inlet and a low-pressure fuel outlet extends, (c) a valve member disposed within the valve body movable in a given direction, the valve member having a valve head which selectively engages and disengages the valve seat according to movement of the valve member in the given direction to establish and block fluid communication between the high-pressure fuel inlet and the low-pressure fuel outlet, the valve member having formed therein a chamber, (d) a sliding member disposed within the chamber of the valve member slidably in the given direction to define a pressure balancing chamber, (e) urging means for urging the valve member into constant engagement of the valve head with the valve seat, (f) a solenoid-operated mechanism urging the valve member out of engagement of the valve head with the valve seat against an urging force produced by the urging means to establish the fluid communication between the high-pressure fuel inlet and the low-pressure fuel outlet, (g) a flow restricting passage formed within the valve head, the flow restricting passage constantly communicating between the pressure balancing chamber and the high-pressure fluid inlet and also communicating between the pressure balancing chamber and the low-pressure fluid outlet when the valve head of the valve member is brought into disengagement from the valve seat, (h) a first pressure-energized surface formed on the valve head of the valve member on which fluid pressure produced by fluid flowing from the high-pressure fuel inlet acts to produce a first force urging the valve head of the valve member into disengagement from the valve seat, and (i) a second pressure-energized surface formed in the valve member on which fuel pressure within the pressure balancing chamber acts to produce a second force urging the valve head of the valve member into engagement with the valve seat, the second force being substantially equal to the first force; (2) an injector body having a spray nozzle for spraying the fuel supplied from the high-pressure fuel inlet; (3) a fuel supply passage formed in the injector body which communicates between the high-pressure fuel inlet and the spray nozzle; (4) an injector valve member disposed slidably within the injector body; (5) injector valve urging means for urging the injector valve member to block fluid communication between the fuel supply passage and the spray nozzle constantly; (6) a pressure control chamber defined within the injector body to which a portion of the injector valve member is exposed, the pressure control chamber communicating with the high-pressure fuel inlet and also communicating with the low-pressure fuel outlet through the valve seat of the solenoid-operated valve when the valve head of the valve member is out of engagement with the valve seat of the solenoid-operated valve to produce a change in fuel pressure within the pressure control chamber which acts on the portion of the injector valve member for establishing the communication between the fuel supply passage and the spray nozzle; (7) a first fuel flow restricting passage formed between the fuel supply passage and the pressure control chamber; and (8) a second fuel flow restricting passage formed between the pressure control chamber and the valve seat of the solenoid-operated valve, a flow area of the second fuel flow restricting passage being greater than that of the first fuel flow restricting passage.

In the preferred mode of the invention, if the diameter of the first fuel flow restricting passage is defined as $d_1$, the diameter of the second fuel flow restricting passage is defined as $d_2$, a first pressure-energized area of the injector valve member on which the fuel within the pressure control chamber acts in a first direction is defined as $A_Q$, a second pressure-energized area of the injector valve member on which the fuel supplied from the fuel supply passage acts in a second direction opposite the first direction is defined as $A_N$, a minimum required injection pressure of the fuel sprayed from the spray nozzle is defined as $P_{IL}$, and a pressure required for urging the injector valve member so as to establish the communication between the fuel supply passage and the spray nozzle is defined as $P_O$, the following relation is satisfied:

$$d_2/d_1 > [A_Q \times P_{IL}/\{A_N \times (P_{IL}-P_O)\}-1]^{1/4}$$

A piston member is further provided which is disposed slidably within the pressure control chamber so as to divide the pressure control chamber into a first and a second pressure chambers. The first fuel flow restricting passage is formed between the fuel supply passage and the second pressure chamber, and the second fuel flow restricting passage is formed between the first and second pressure chambers.

The second fuel flow restricting passage is formed in the piston member.

A piston urging means is further provided for urging the piston member from the first pressure chamber to the second pressure chamber. When a pressure within the second pressure chamber exceeds that within the first pressure chamber, the piston member is moved so as to increase a volume of the second pressure chamber, while decreasing a volume of the first pressure chamber.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 2:
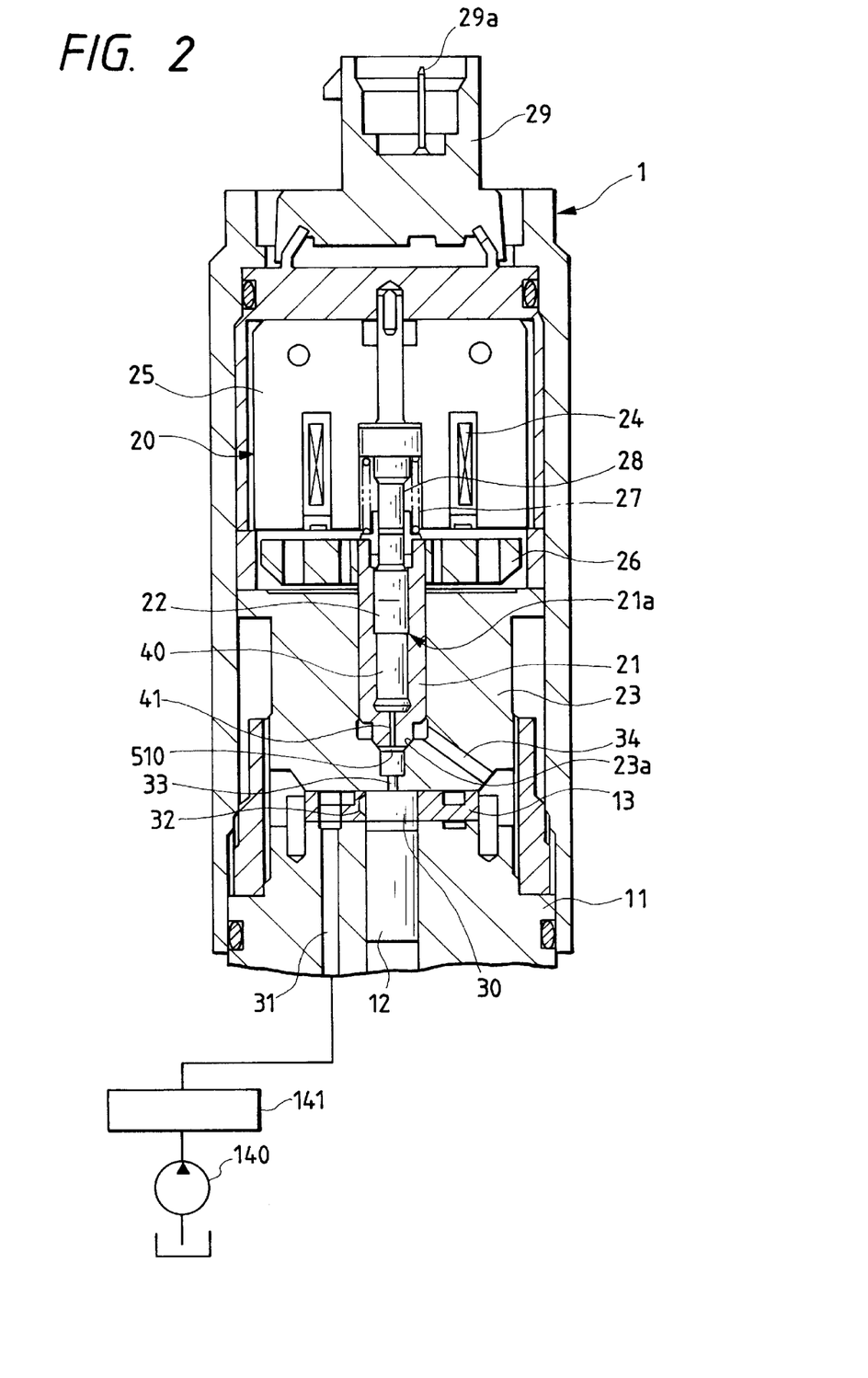
FIG. 2 is a partially cross-sectional view which shows a fuel injector of the first embodiment of the invention.

Referring now to the drawings, particularly to FIG. 2, there is shown a fuel injector for diesel engines with which a solenoid valve of the invention is used. Note that a portion of the structure of the shown fuel injector 1 omitted in FIG. 2 is the same as shown in FIG. 1.

The control piston 12 which is connected to a needle valve like the one shown in FIG. 1 is slidably disposed within the injector body 11. The pressure control chamber 30 is defined within the injector body 11 to which an upper end of the control piston 12 is exposed. The fuel pressurized in an accumulator chamber of the common rail 141 is supplied to the pressure control chamber 30 through the fuel supply passage 31 and the orifice 32. The fuel pressure within the pressure control chamber 30 acts on the control piston 12 in a direction of closing the spray hole of the fuel injector 1. The pressurized fuel supplied to the fuel supply passage 31 also flows to a fuel reservoir around the needle valve. The upward movement of the needle valve causes the fuel in the fuel reservoir to be sprayed from the spray hole.

The solenoid valve 20 is installed on the injector body 11 and has the valve 21 made of a hollow cylindrical member. The valve 21 is slidably disposed within the valve body 23 and urged by the spring 27 into constant engagement with the valve seat 23a. The pressure balancing chamber 40 is defined within the valve 21 by the balancing piston 22 and communicates with the pressure control chamber 30 through the flow restricting passage 41 formed in an end of the valve 21 and the flow restricting passage 33 formed in the valve body 23. When the valve 21 leaves the valve seat 23a, it will cause the pressurized fuel within the pressure control chamber 30 to flow to the fuel return passage 34 through the flow restricting passage 33 and then to, for example, a fuel tank through a fuel outlet (not shown) formed in the valve body 23.

Figures 3A, 3B:
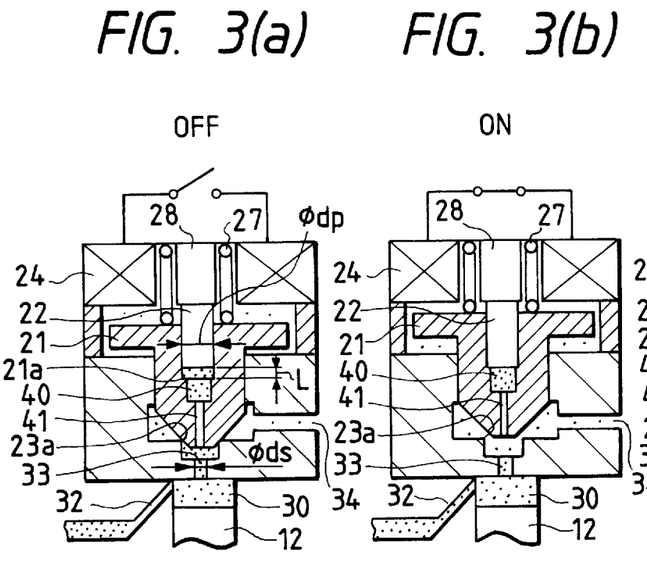
FIGS. 3(a) to 3(d) are partially cross-sectional views which show sequential operations of a solenoid valve disposed within the fuel injector of FIG. 2.

A cross-sectional area $\phi d_P$, as shown in FIG. 3(a), of the balancing piston 22 and a seat area $\phi d_S$ of a head of the valve 21 are substantially equal to each other. In other words, the force produced by the fuel pressure from the pressure control chamber 30 acting on a pressure-energized surface 510, as shown in FIG. 2, of the valve 21 in a valve lifting direction when the valve 21 is seated on the valve seat 23a is nearly balanced with the force produced by the fuel pressure in the pressure balancing chamber 40 urging the valve 21 into engagement with the valve seat 23a. Since the fuel pressure acting on pressure-energized surfaces of the valve 21 other than the pressure-energized surface 510 is much smaller than the fuel pressures in the pressure control chamber 30 and the pressure balancing chamber 40, the forces acting on the valve 21 in valve-opening and -closing directions may be considered to be equal to each other. Therefore, it is possible to decrease the spring force of the spring 27 required for seating the valve 21 on the valve seat 23a as compared with a conventional type. It is also possible to decrease the attracting force produced by the coil 24 of the solenoid valve 20 lifting the valve 21 upward against the spring force of the spring 27. This allows the size of an overall structure of the solenoid valve 20 to be reduced.

The balancing piston 22 is slidably disposed within the valve 21 in liquid-tight engagement with an inner wall of the valve 21. The inner wall of the valve 21 has formed thereon the shoulder portion 21a, as viewed in FIGS. 2 and 3(a). When the valve 21 is lifted upward, the balancing piston 22 engages the shoulder portion 21a, thereby restricting further upward movement of the valve 21. Upon start of an engine, the pressurized fuel is supplied from the common rail 141 to the fuel injector 1 through the fuel supply passage 31 to move the balancing piston 22 upward a distance L, as shown in FIG. 3(a), into engagement with the stopper 28.

The solenoid valve 20 includes the coil 24 made of wire wound within an annular groove formed in the core 25. Pulses are applied to the coil 24 through the pin 29a of the connector 29 from a controller (not shown). When the coil 25 is energized, it produces magnetic attraction to draw the valve 21 along with the armature 26 against the spring force of the spring 27, thereby causing the valve 21 to leave the valve seat 23a.

The operation of the fuel injector 1 will be discussed below with reference to FIGS. 2 and 3(a) to 3(d). In FIGS. 3(a) to 3(d), the density of dots indicates the level of fuel pressure, and a higher density of dots indicates a higher level of the fuel pressure.

When the coil 24 is in an off position as shown in FIG. 3(a), the valve 21 is seated on the valve seat 23a, blocking the fluid communication between the pressure control chamber 30 and the fuel return passage 34 so that the fuel pressures in the pressure control chamber 30 and the pressure balancing chamber 40 are maintained at high levels. The forces produced by the fuel pressures acting on the valve 21 in the valve-opening direction and the valve-closing direction are, as mentioned above, substantially equal to each other.

When the coil 24 is energized, the valve 21 leaves, as shown in FIG. 3(b), the valve seat 23a to establish the fluid communication between the pressure control chamber 30 and the fuel return passage 34. Since a flow area of the flow restricting passage 33 is greater than that of the orifice 32, the fuel pressure within the pressure control chamber 30 is decreased. This decrease in fuel pressure causes the needle valve to be lifted up along with the control piston 12 so that the fuel is sprayed from the spray hole.

The flow rate of fuel within the pressure balancing chamber 40 flowing to the low-pressure side (i.e., the fuel return passage 34) is restricted by the throttling passage 41, so that the fuel pressure in the pressure balancing chamber 40 is decreased more gradually than that in the pressure control chamber 30. Thus, immediately after the coil 24 is energized as shown in FIG. 3(*b*), the fuel pressure within the pressure balancing chamber 40 is maintained at a higher level than that on the low-pressure side.

Figure 3C:
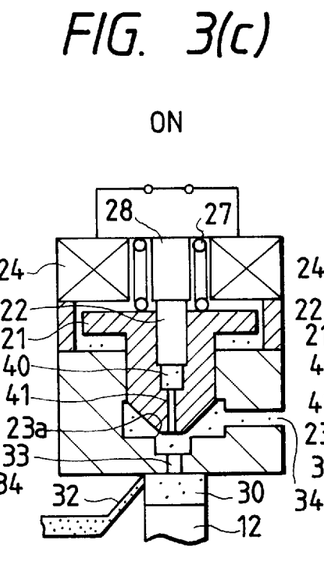

The pulse width supplied to the coil 24 during normal fuel injection control is greater than that during small fuel injection quantity control. Thus, during the energization of the coil 24 as shown in FIG. 3(*c*), the fuel within the pressure balancing chamber 40 flows to the fuel return passage 34 against the flow resistance of the flow restricting passage 41, so that the fuel pressure within the pressure balancing chamber 40 will become equal to that on the low-pressure side.

Figure 3D:
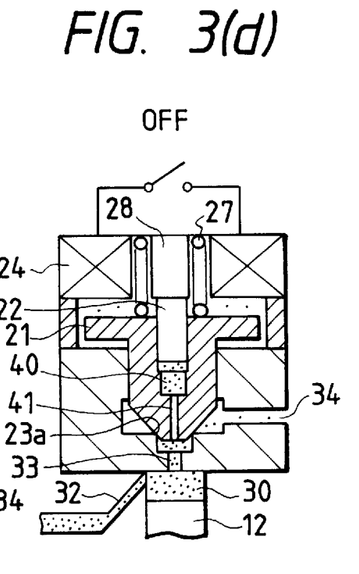

Subsequently, when the coil 24 is deenergized as shown in FIG. 3(*d*), it will cause only the spring force of the spring 27 to urge the valve 21 slowly into engagement with the valve seat 23*a* to block the fluid communication between the pressure balancing chamber 40 and the fuel return passage 34. This elevates the fuel pressure within the pressure control chamber 30 to move the control piston 12 downward, thereby moving the needle valve in the valve-closing direction to stop the fuel injection.

Since time intervals at which the solenoid valve 20 is turned on and off during the normal fuel injection control are, as discussed above, longer than those during the small fuel injection quantity control, the low-speed engagement of the valve 21 with the valve seat 23*a* does not impinge on the fuel injection quantity and injection timing control.

Conversely, since the width of the pulse supplied to the coil 24 during the small fuel injection quantity control is smaller than that during the normal fuel injection control shown in FIG. 3(*c*), the fuel pressure within the pressure balancing chamber 40 is maintained higher than that on the low-pressure side, similar to the one shown in FIG. 3(*b*), even immediately before the coil 24 is turned off due to the flow resistance of the flow restricting passage 41. Therefore, when the coil 24 is changed from the on position to off position at a very short time interval, it will cause the difference in pressure between the pressure balancing chamber 40 and the low-pressure side to urge the valve 21 toward the valve seat 23*a*. This pressure plus the spring force of the spring 27 urges the valve 21 into engagement with the valve seat 23*a* quickly when the coil 24 is turned off even if the residual magnetic flux remains in the coil 24, thereby resulting in a rapid rise in fuel pressure in the pressure control chamber 30.

Immediately before the coil 24 is changed from the off position to the on position at a very short time interval in the small fuel injection quantity control, the flow rate of fuel flowing from the pressure control chamber 30 to the pressure balancing chamber 40 is restricted by the flow resistance of the flow restricting passage 41, so that the fuel pressure in the pressure control chamber 30 is, as shown in FIG. 3(*d*), higher than that in the pressure balancing chamber 40. Specifically, the pressure difference between the pressure control chamber 30 and the pressure balancing chamber 40 urges the valve 21 upward. When the coil 24 is turned on from this condition, it will cause the pressure difference between the pressure control chamber 30 and the pressure balancing chamber 40 as well as the attracting force of the coil 24 to urge the valve 21 upward so that it leaves the valve seat 23*a* quickly, resulting in rapid decrease in fuel pressure in the pressure control chamber 30, thereby lifting up the needle valve along with the control piston 12. This achieves a high-speed fuel spray operation in response to turning on of the coil 24.

Therefore, even when the coil 24 is turned on and off cyclically at short time intervals under the small fuel injection quantity control, the fuel pressure in the pressure balancing chamber 40 acts on the valve 21 both in the valve-opening direction and in the valve-closing direction properly, thereby achieving high-speed valve opening and closing operations.

Figures 4, 4A:
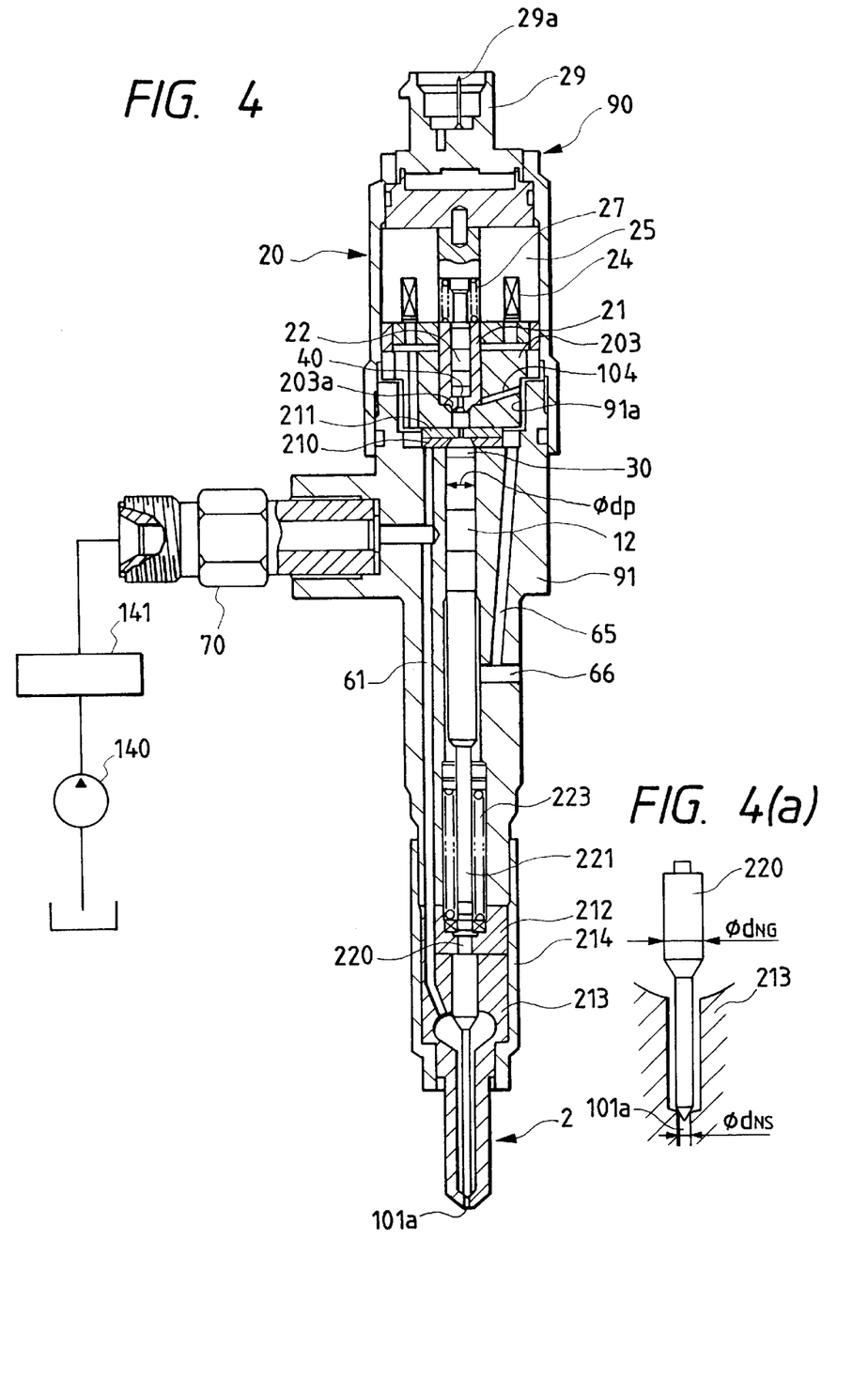
FIG. 4 is a cross-sectional view which shows a fuel injector of the second embodiment of the invention.
FIG. 4(a) is a partially expanded view which shows a needle valve and a spray hole in FIG. 4.
Figure 5:
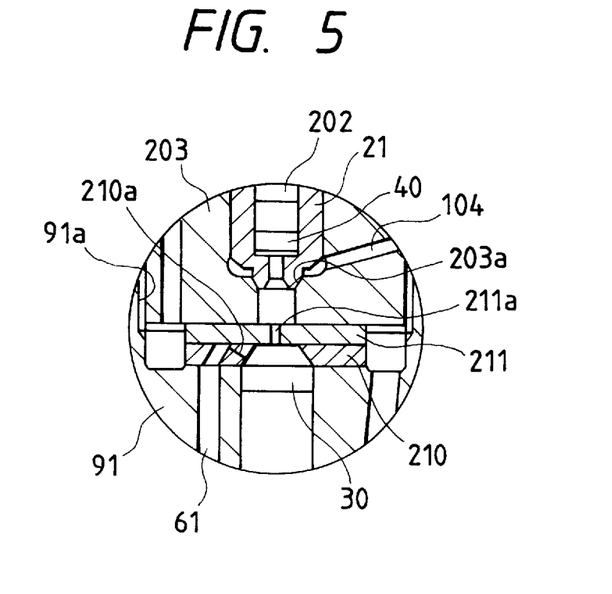
FIG. 5 is a partially enlarged sectional view of FIG. 4.

FIGS. 4 and 5 shows the second embodiment of the fuel injector of the invention. The same reference numbers as employed in the above first embodiment refer to the same parts, and explanation thereof in detail will be omitted here.

The fuel injector 90 has the two-port solenoid valve 20 as clearly shown in FIG. 4. The solenoid valve 20 includes the valve 21 and the balancing piston 22. The valve 21 is disposed slidably within the valve body 203 and has formed therein the pressure balancing chamber 40. The balancing piston 22 is slidably disposed within the pressure balancing chamber 40 in liquid-tight engagement with an inner wall of the pressure balancing chamber 40. The pressure balancing chamber 40 communicates with the pressure control chamber 30. When a head of the valve 21 is seated on the valve seat 203*a*, it blocks fluid communication of the pressure balancing chamber 40 and the pressure control chamber 30 with the fuel return passage 104 which is connected to the fuel outlet 66 through the fuel return passage 65. The fuel outlet 66 is connected to, for example, a fuel tank.

The needle valve 220 is slidably disposed within the nozzle body 213 of the spray nozzle 2 for opening and closing the spray hole 101*a*. The nozzle body 213 and the injector body 91 are joined by the retaining nut 214 through the distance piece 212. The pressure pin 221 is disposed between the pressure control piston 12 and the needle valve 220 and inserted into the spring 223. The pressure pin 221 may be secured to the pressure control piston 12 using a pin or press-fit or welding manner. The spring 223 urges the pressure pin 221 downward, as viewed in the drawing. The pressurized fuel is supplied from the common rail 141 connected to the fuel pump 140 to the fuel supply passage 61 through the fuel inlet 70. When the needle valve 220 is lifted up, the pressurized fuel within the fuel supply passage 61 is sprayed from the spray hole 101*a* of the spray nozzle 2.

A circular recessed portion 91*a* is formed in an upper end of the injector body 91 which has formed on an inner wall thereof internal threads meshing with external threads formed on an outer wall of the valve body 203. This allows the length of the fuel injector 90 to be decreased as compared with a conventional type. The fuel injector 90 may thus be used with an engine wherein an injector-mounting space is small. The circular recessed portion 91*a* may alternatively be formed in the valve body 203 for tight engagement with the injector body 91. Similar arrangements may also be used when a three-port solenoid valve is employed.

Disposed between the injector body 91 and the valve body 203 are, as shown in FIG. 5, the first flow restricting plate 210 and the second flow restricting plate 211. The first flow restricting plate 210 has formed therein the inlet orifice 210*a* which restricts fuel flow from the fuel supply passage 61 to the pressure control chamber 30. The second flow restricting plate 211 has formed therein the outlet orifice 211*a* which restricts fuel flow from the pressure control chamber 30 to the pressure return passage 104 and which has an flow area (i.e., a cross-sectional area) greater than that of the inlet orifice 210a. The injector body 91, the first flow restricting plate 210, the second flow restricting plate 211, and the valve body 203 are, as apparent from the drawing, designed to be joined together in flat surface. It is thus easy to machine each element.

In operation, when the coil 24 of the solenoid valve 20 is in the off position, the valve 21 is seated on the valve seat 203a as shown in FIG. 5, blocking the fluid communication of the pressure control chamber 30 and the pressure balancing chamber 40 with the fuel return passage 104 so that the fuel pressures within the pressure control chamber 30 and the pressure balancing chamber 40 are maintained at high levels. The pressures or forces urging the valve 21 in the valve-opening and -closing directions are, as described above, substantially equal to each other.

When the coil 24 is turned on, it will cause the valve 21 leaves the valve seat 203a to establish the fluid communication of the pressure control chamber 30 and the pressure balancing chamber 40 with the fuel return passage 104. Since the flow area of the outlet orifice 211a is, as described above, greater than that of the inlet orifice 210a, the fuel pressure within the pressure control chamber 30 is decreased, thereby causing the needle valve 220 to be lifted up along with the control piston to spray the fuel from the spray nozzle 2.

If the diameter of the control piston 12, as clearly shown in FIG. 4, is defined as $d_P$, the diameter of a guide hole formed in the nozzle body 213 in which the needle valve 220 is moved up and down in liquid-tight engagement (i.e., the diameter of a large-diameter portion of the needle valve 220 as shown in FIG. 4(a)) is defined as $d_{NG}$, the diameter of a seat area of a head of the needle valve 220 exposed to the spray hole 101a (identical with the diameter of the spray hole 101a in this embodiment) is defined as $d_{NS}$, the fuel pressure supplied from the common rail 141 to the fuel injector 90 is defined as $P_C$, and the valve-opening pressure required for lifting up the needle 220 to open the spray hole 101a of the spray nozzle 2 is defined as $P_O$, then the pressure $P_{CC1}$ within the pressure control chamber 30 when lifting up the needle valve 220 along with the control piston 12 for initiating the fuel injection is $$P_{CC1}=(d_{NG}^2-d_{NS}^2)\times(P_C-P_O)/d_P^2 \tag{1}$$

where the valve-opening pressure $P_O$ represents the fuel pressure required for lifting up the needle valve 220 when the pressure within the pressure control chamber 30 is ignored. In the equation (1), $(d_{NG}^2-d_{NS}^2)/d_P^2$ corresponds to (a pressure-energized area of the needle valve 220 on which the fuel pressure supplied from the fuel supply passage 61 acts in the lengthwise direction of the fuel injector 90)/(a pressure-energized area of the control piston 12 on which the fuel pressure within the pressure control chamber 30 acts in a lengthwise direction of the fuel injector 90). Thus, if the pressure-energized area of the needle valve 220 is defined as $A_N$, and the pressure-energized area of the control piston 12 is defined as $A_Q$, the equation (1) may be rewritten as follows:

$$P_{CC1}=A_N\times(P_C-P_O)/A_Q \tag{1.1}$$

The spring force $F_S$ of the spring 223 is expressed using the valve-opening pressure $P_O$, the diameter $d_{NG}$ of the needle valve 220, and the seat diameter $d_{NS}$ of the needle valve 220 as follows:

$$F_S=(\pi/4)\times(d_{NG}^2-d_{NS}^2)\times P_O \tag{2}$$

From the above equation (2), the valve-opening pressure $P_O$ may be determined. In this embodiment, $d_{NG}$=4 mm, $d_{NS}$=2.25 mm, $d_P$=5 mm, $F_S$=10.3 kg, and $P_O$=120 kgf/cm$^2$.

Figure 6:
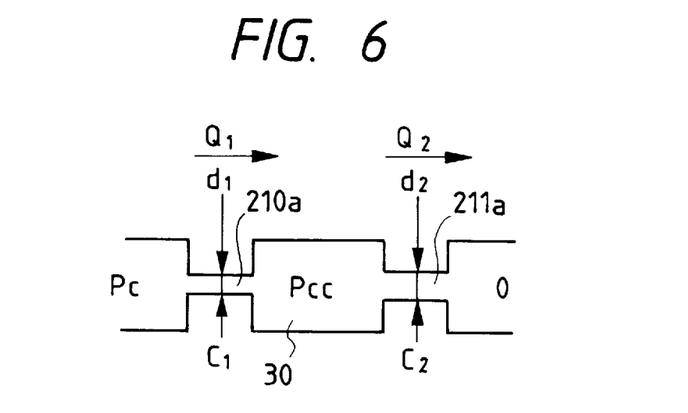
FIG. 6 is an illustration which shows a change in pressure of fuel passing through an inlet orifice and an outlet orifice.
Figure 7:
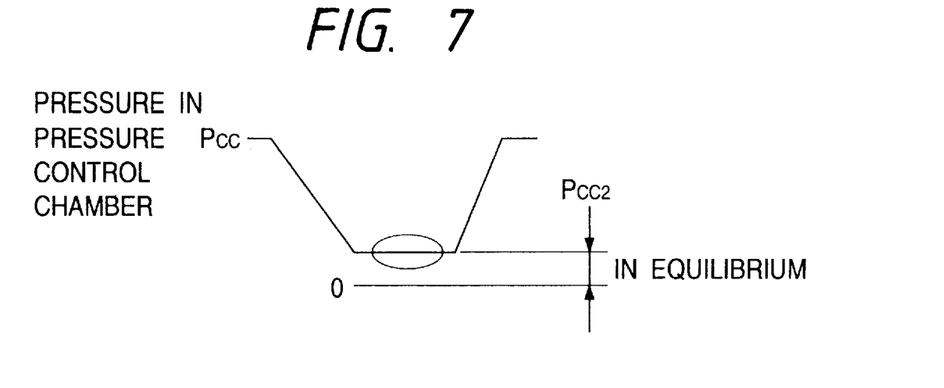
FIG. 7 is a graph which shows a variation of pressure $P_{CC}$ within a pressure control chamber.

When the valve 21 leaves the valve seat 203a, the flow rate of fuel entering the pressure control chamber 30 is balanced with that flowing out of the pressure control chamber 30. If the flow rate of fuel passing through the inlet orifice 210a is, as shown in FIG. 6, defined as $Q_1$, the flow coefficient of the inlet orifice 210a is defined as $C_1$, the flow rate of fuel passing through the outlet orifice 211a is defined as $Q_2$, and the flow coefficient of the outlet orifice 211a is defined as $C_2$, in a steady state, as shown in FIG. 7, wherein the pressure $P_{CC}$ within the pressure control chamber 30 reaches the constant minimum pressure $P_{CC2}$ as represented by the equation (3) below, then $Q_1$ will be equal to $Q_2$.

$$C_1\times d_1^2\times(P_C-P_{CC2})^{1/2}=C_2\times d_2^2\times P_{CC2}^{1/2} \tag{3}$$

where $d_1$ is the diameter of the inlet orifice 210a, and $d_2$ is the diameter of the outlet orifice 211a. If $C_1$=$C_2$, then $P_{CC2}$ is given by the equation (4) below and changes depending upon a value of $d_2/d_1$ as well as a value of the supplied fuel pressure $P_C$.

$$P_{CC2}=P_C/\{1+(d_2/d_1)^4\} \tag{4}$$

Figure 8:
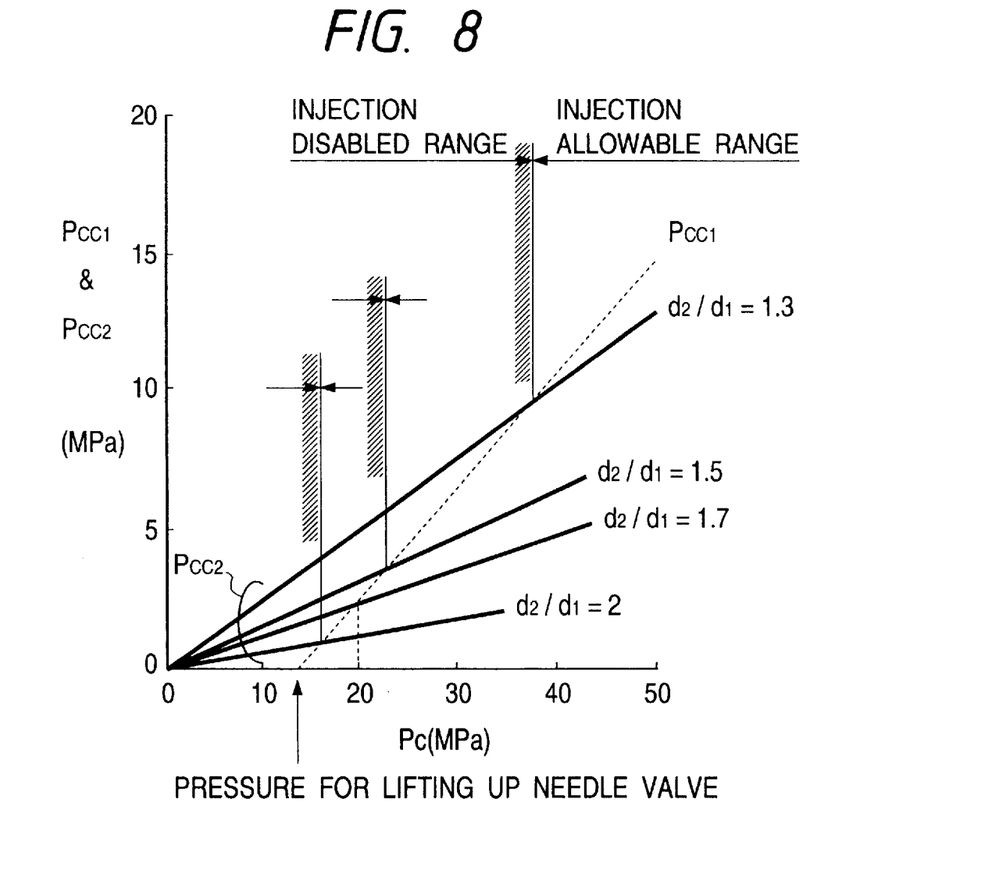
FIG. 8 is a graph which shows the relation among supplied fuel pressure $P_C$ and pressure $P_{CC1}$ and minimum pressure $P_{CC2}$ within a pressure control chamber.

FIG. 8 shows the relation among the supplied fuel pressure $P_C$, the pressure $P_{CC1}$ within the pressure control chamber 30, and the minimum pressure $P_{CC2}$. A broken line indicates the above equation (1), and solid lines indicate the equation (4) when $d_2/d_1$ is changed.

Within a range of $P_{CC1}>P_{CC2}$, the fuel injector 90 is enabled to spray the fuel. Specifically, when the supplied fuel pressure $P_C$ exceeds intersections of the broken line and the solid lines as shown in FIG. 8, it becomes possible to spray the fuel. As can be seen from the drawing, as $d_2/d_1$ is increased, a minimum value of the supplied fuel pressure $P_C$ required for spraying the fuel is decreased.

Substituting the equations (1) and (4) for the relation of $P_{CC1}>P_{CC2}$, the equation (5) below is derived.

$$(d_{NG}^2-d_{NS}^2)\times(P_C-P_O)/d_P^2 > P_C/\{1+(d_2/d_1)^4\} \tag{5}$$

Rearranging the above equation (5), and substituting a minimum injection pressure $P_{IL}$ required for assuring given engine performance for the supplied fuel pressure $P_C$, the following equation (6) is derived.

$$d_2/d_1>[d_P^2\times P_{IL}/\{(d_{NG}^2-d_{NS}^2)\times(P_{IL}-P_O)\}-1]^{1/4} \tag{6}$$

Rewriting the equation (6) using $A_N$ and $A_Q$ as employed in the equation (1.1), we obtain $$d_2/d_1>[A_Q\times P_{IL}/\{A_N\times(P_{IL}-P_O)\}-1]^{1/4} \tag{6.1}$$

It will thus be appreciated that even if the diameter $d_P$ of the control piston 12, the guide diameter $d_{NG}$ of the needle valve 220, the seat diameter $d_{NS}$ of the needle valve 220, and the valve-opening pressure $P_O$, and the minimum injection pressure $P_{IL}$ are changed, the fuel injection from the fuel injector 90 is accomplished by selecting a value of $d_2/d_1$ so as to meet the equation (6).

When the coil 24 is turned off, the valve 21 is seated on the valve seat 203a by the spring force of the spring 27, thereby blocking the fluid communication between the pressure balancing chamber 40 and the fuel return passage 104. This causes the pressure $P_{CC}$ within the pressure control chamber 30 to rise to move the needle valve 220 into engagement with the spray hole 101a of the spray nozzle 2 so that the fuel injection is stopped.

Figure 9:
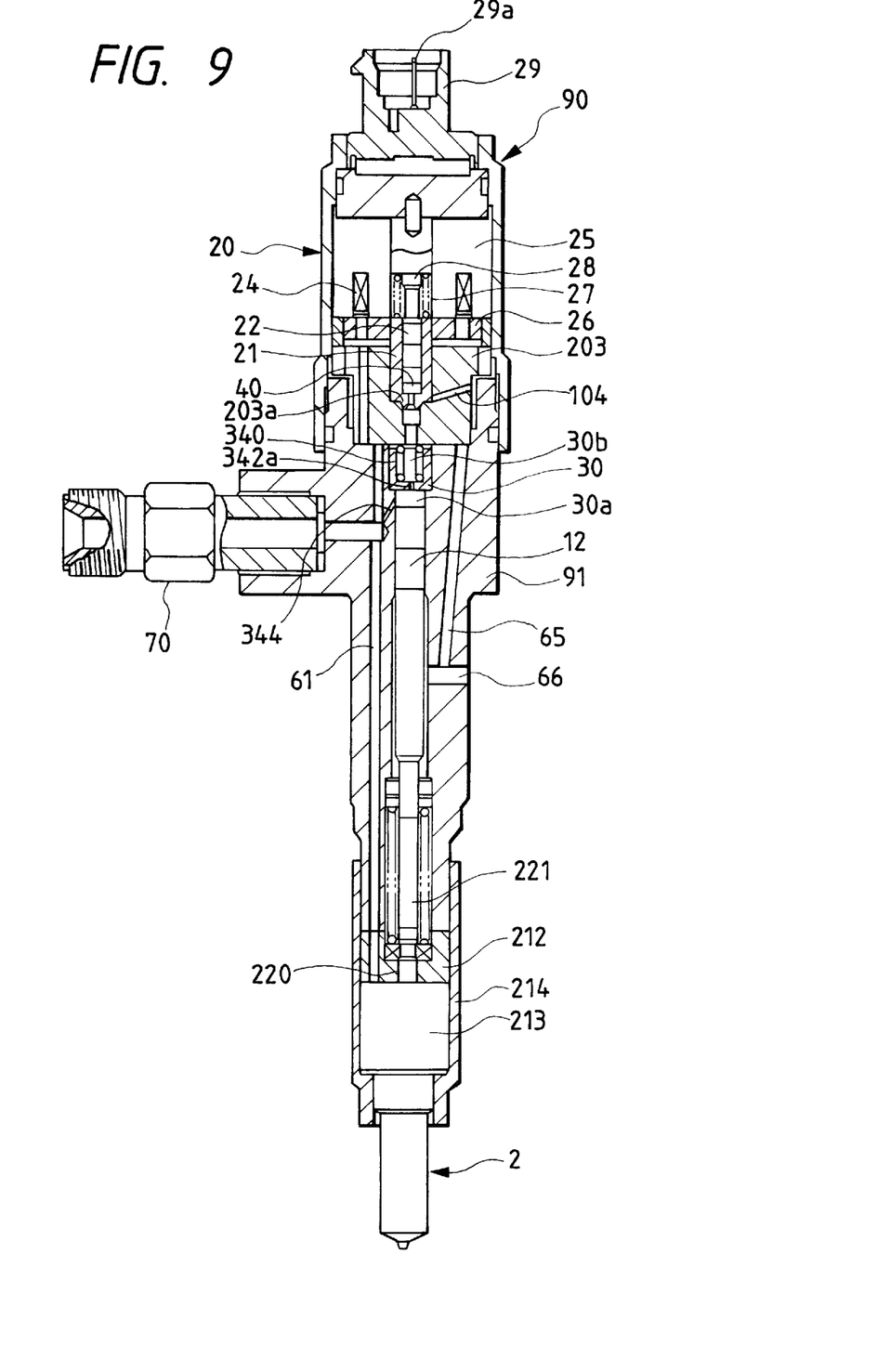
FIG. 9 is a cross-sectional view which shows a fuel injector of the third embodiment of the invention.
Figure 10:
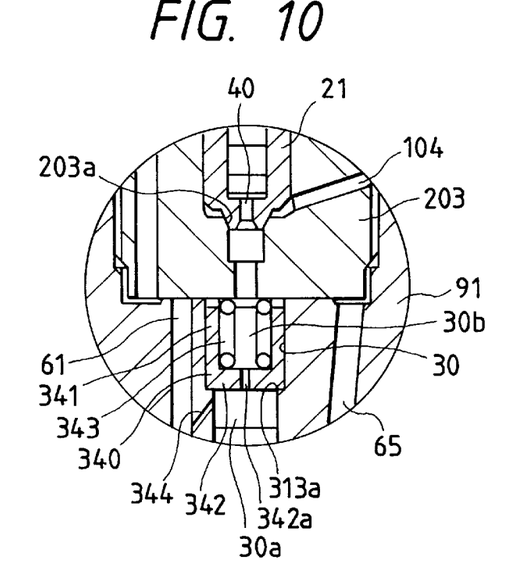
FIG. 10 is a partially enlarged sectional view of FIG. 9.

FIGS. 9 and 10 show the third embodiment of the fuel injector of the invention which is different from the second embodiment shown in FIGS. 4 and 5 only in the structure as shown in FIG. 10. Other arrangements are identical, and explanation thereof in detail will be omitted here.

The flow restricting piston 340 is, as shown in FIG. 10, disposed within the pressure control chamber 30 and urged by the spring 343 into constant engagement with the shoulder portion (i.e., a seat) 313a formed in an inner wall of the injector body 91. The flow restricting piston 340 includes the hollow cylinder 341 and the bottom 342 integrally formed with the cylinder 341. The cylinder 341 is moved with turning on and off of the solenoid valve 20 vertically, as viewed in the drawing, in liquid-tight engagement of an outer wall thereof with the inner wall of the injector body 91. The flow restricting piston 340 divides at the bottom 342 the pressure control chamber 30 into the first pressure control chamber 30a and the second pressure control chamber 30b which communicate with each other through the flow restricting passage or orifice 342a formed in the bottom 342. The orifice 342a restricts the flow rate of fuel entering the second pressure control chamber 30b from the first pressure control chamber 30a. The first pressure control chamber 30a communicates with the fuel supply passage 61 through the inlet orifice 344. The second pressure control chamber 30b communicates with the pressure balancing chamber 40 formed in the outer valve 201. A flow area of the orifice 342a is greater than that of the inlet orifice 344.

The operation of the fuel injector 90 when the supplied fuel pressure Pc is at a lower level (i.e., $P_{CC1} < P_{CC2}$ as discussed later) will be discussed below with reference to FIGS. 11(a) to 11(d) and 12.

Figure 11A:
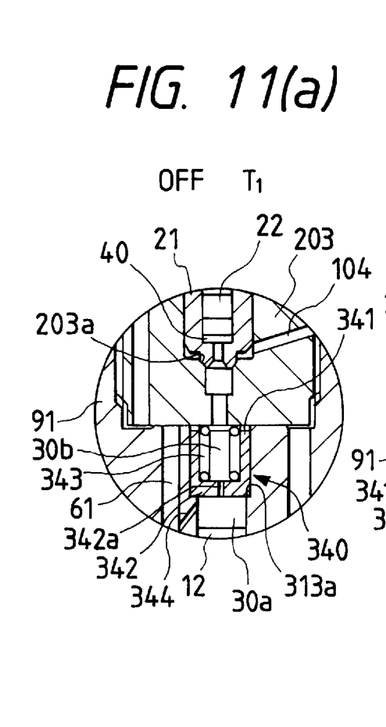
FIGS. 11(a) to 11(d) are partially cross-sectional views which show sequential operations of a solenoid valve disposed within the fuel injector of FIG. 9.
Figure 11B:
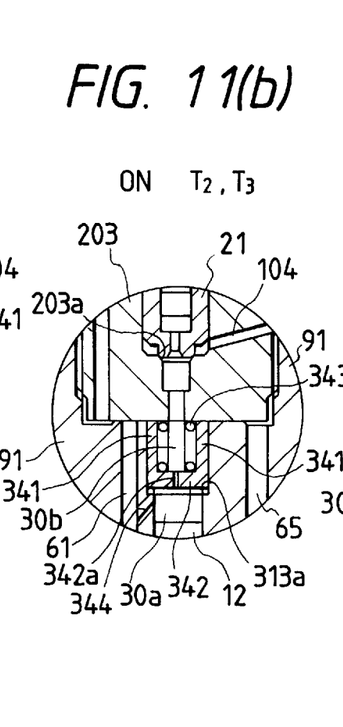

When the coil 24 of the solenoid valve 20 is in the off position, the valve 21 is, as shown in FIG. 11(a), seated on the valve seat 203a, blocking the fluid communication of the pressure control chamber 30 and the pressure balancing chamber 40 with the fuel return passage 104 so that the fuel pressures within the first and second pressure control chambers 30a and 30b and the pressure balancing chamber 40 are maintained at high levels. The pressures or forces urging the valve 21 in the valve-opening and -closing directions are, as described above, substantially equal to each other.

When the coil 24 is turned on, it will cause the valve 21 to leave the valve seat 203a to establish the fluid communication between the second pressure control chamber 30b and the fuel return passage 104 and between the first pressure control chamber 30a and the fuel return passage 104 through the orifice 342a and the second pressure control chamber 30b. Since the flow rate of fuel entering the second pressure control chamber 30b from the first pressure control chamber 30a is restricted by the orifice 342a, and the flow area of the orifice 342a is, as described above, greater than that of the inlet orifice 344, the fuel pressures within the first and second pressure control chambers 30a and 30b are decreased so that the fuel pressure within the second pressure chamber 30b is lower than that of the first pressure control chamber 30a. This produces a pressure difference between the first and second pressure control chambers 30a and 30b which is greater than the spring force of the spring 343, thereby causing the flow restricting piston 340 to leave the shoulder portion 313a so that an upper end of the cylinder 341 is brought into engagement with the bottom of the valve body 203, thus increasing the volume of the first pressure control chamber 30a.

The pressure $P_{CC1}$ within the first pressure chamber 30a may be derived by the equation (1) as described above.

When the valve 21 leaves the valve seat 203a, and the cylinder 341 engages the valve body 203, the flow rate of fuel entering the first pressure control chamber 30a is balanced with that flowing out of the second pressure control chamber 30b. If the diameter of the inlet orifice 344 is defined as $d_1$, the flow rate of fuel passing through the inlet orifice 344 is defined as $Q_1$, the flow coefficient of the inlet orifice 344 is defined as $C_1$, the diameter of the outlet orifice 342a is defined as $d_2$, the flow rate of fuel passing through the outlet orifice 342a is defined as $Q_2$, and the flow coefficient of the outlet orifice 342a is defined as $C_2$, in a steady state wherein the pressure $P_{CC}$ within the first pressure control chamber 30a reaches the constant minimum pressure $P_{CC2}$ as represented by the equation (3), then $Q_1$ will be equal to $Q_2$.

Figure 12:
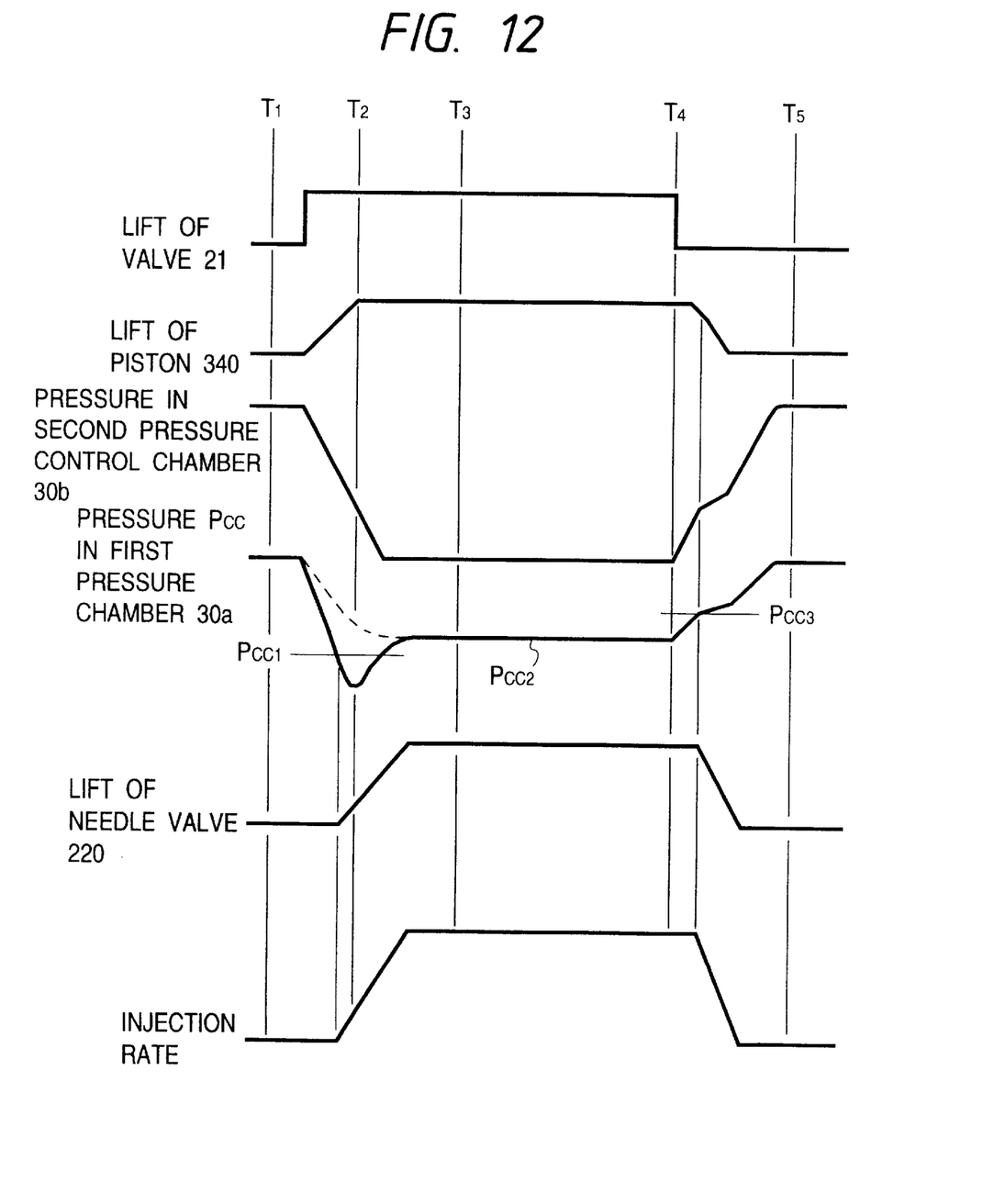
FIG. 12 is a time chart which shows operations of the valve 201, the flow restricting piston 340, and the needle valve 220, changes in pressure of the first and second pressure control chambers 30a and 30b, and a fuel injection rate.
Figure 13:
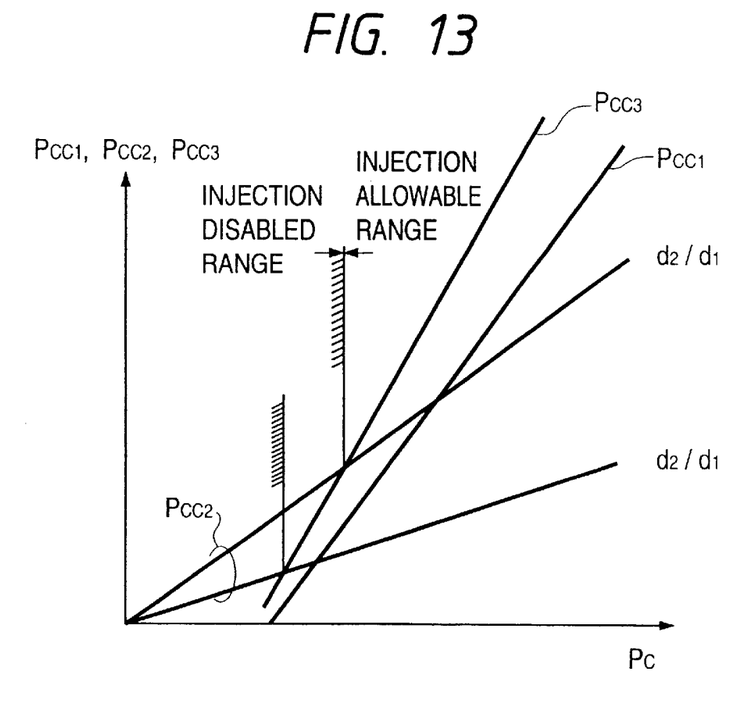
FIG. 13 is a graph which shows the relation among supplied fuel pressure $P_C$, pressure $P_{CC1}$ and minimum pressure $P_{CC2}$ within a first pressure control chamber, and fuel pressure $P_{CC3}$ within the first pressure chamber required for closing a spray nozzle.

When the supplied fuel pressure $P_C$ drops during rest of the flow restricting piston 340 to fall within a range of $P_{CC1} < P_{CC2}$ as shown in FIG. 13, it will cause the fuel injector 90 to be deactivated so that the fuel is not sprayed. However, when the solenoid valve 20 is turned on to lift up the flow restricting piston 340 so that the volume of the first pressure control chamber 30a is increased, the pressure $P_{CC}$ within the first pressure control chamber 30a drops, as shown in FIG. 12, below the pressure $P_{CC1}$ which is smaller than the minimum pressure $P_{CC2}$. This pressure drop causes the needle valve 220 to be lifted up along with the pressure control piston 12 so that the fuel is sprayed from the spray nozzle 2.

When the needle valve 220 is lifted up, a pressure-energized area of the needle valve 220 on which the fuel pressure supplied from the fuel supply passage 61 acts in the valve-opening direction is increased so that the fuel pressure $P_{CC3}$ within the first pressure chamber 30a required for moving the needle valve 220 downward to close the spray nozzle 2 will be higher than the minimum pressure $P_{CC2}$ as well as the pressure $P_{CC1}$. The fuel pressure $P_{CC3}$ may be expressed by the following equation.

$$P_{CC3} = \{d_{NG}^2 \times P_C - (d_{NG}^2 - d_{NS}^2) \times P_O\}/d_P^2 \qquad (7)$$

Therefore, even after the increase in volume of the first pressure control chamber 30a is stopped, and then the fuel pressure within the first pressure control chamber 30a is elevated to reach the minimum pressure $P_{CC2}$, the fuel injector 90 is allowed to spray the fuel.

Figure 11C:
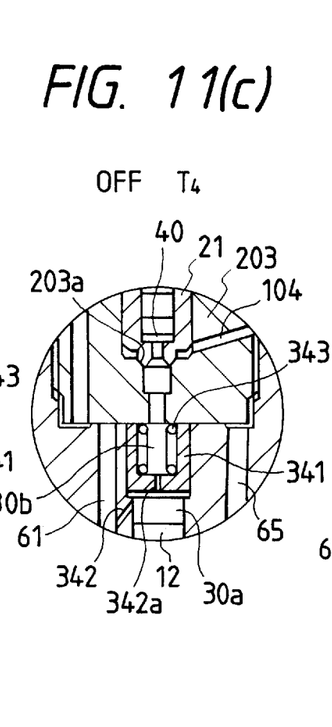

When the coil 24 is turned off, the valve 21 is, as shown in FIG. 11(c), seated on the valve seat 203a by the spring force of the spring 27 to block the fluid communication of the second pressure chamber 30b and the pressure balancing chamber 40 with the fuel return passage 104. The fuel flowing through the inlet and outlet orifices 344 and 342a increases, as can be seen in FIG. 12, the fuel pressures within the first and second pressure control chambers 30a and 30b. However, immediately after the coil 24 is turned off, the pressure difference between the first and second pressure control chambers 30a and 30b prevents the flow restricting piston 340 from dropping so that the flow restricting piston 340 is in engagement with the bottom of the valve body 203. The needle valve 220 is not moved downward until the fuel pressure $P_{CC}$ within the first pressure control chamber 30a exceeds the fuel pressure $P_{CC3}$.

Figure 11D:
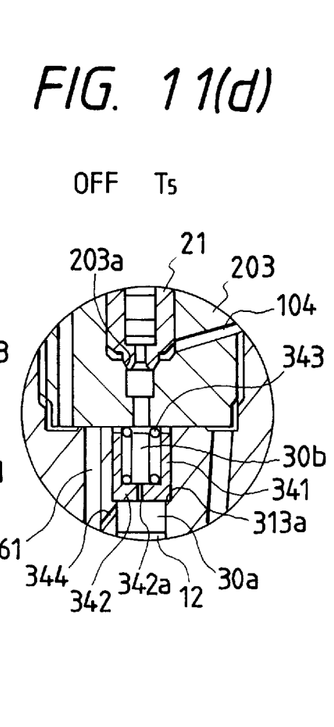

When the coil 24 continues to be turned off, the pressure difference between the first and second pressure control chambers 30a and 30b is decreased so that the flow restricting piston 340 starts to move downward by the spring force of the spring 343. When the fuel pressure $P_{CC}$ within the first pressure control chamber 30a continues to be elevated and exceeds the fuel pressure $P_{CC3}$, it will cause the needle valve 220 to be moved downward in the valve-closing direction along with the control piston 12. This increases the volume of the first pressure control chamber 30a so that the fuel pressure therewithin is decreased, thereby causing the flow restricting piston 340 to be moved downward quickly to increase the volume of the second pressure control chamber 30b. Specifically, the rates of elevation in pressure within the first and second pressure control chambers 30a and 30b drop, as shown in FIG. 12, for a short time, however, upon engagement of the bottom 342 of the flow restricting piston 340 with the shoulder portion 313a as shown in FIG. 11(d), the rates of elevation in pressure within the first and second pressure control chambers 30a and 30b are increased again. The needle valve 220 then closes the spray nozzle 2 to stop the fuel injection.

As apparent from the above discussion, the fuel injector 90 of the third embodiment is operable to spray the fuel as long as the supplied fuel pressure $P_C$ drops to fall in the range of $P_{CC1} < P_{CC2}$, but the condition of $P_{CC3} > P_{CC2}$ is met.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A fuel injector comprising:
   a fuel injector comprising:
   (1) a solenoid-operated valve including
      (a) a valve body,
      (b) a valve seat formed within said valve body through which a fluid passage communicating between a high-pressure fuel inlet and a low-pressure fuel outlet extends,
      (c) a valve member disposed within said valve body movable in a given direction, said valve member having a valve head which selectively engages and disengages said valve seat according to movement of said valve member in the given direction to establish and block fluid communication between the high-pressure fuel inlet and the low-pressure fuel outlet, said valve member having formed therein a chamber,
      (d) a sliding member disposed within the chamber of said valve member slidably in the given direction to define a pressure balancing chamber,
      (e) urging means for urging said valve member into constant engagement of the valve head with said valve seat,
      (f) a solenoid-operated mechanism urging said valve member out of engagement of the valve head with said valve seat against an urging force produced by said urging means to establish the fluid communication between the high-pressure fuel inlet and the low-pressure fuel outlet.
      (g) a flow restricting passage formed within the valve head, said flow restricting passage constantly communicating between the pressure balancing chamber and the high-pressure fluid inlet and also communicating between the pressure balancing chamber and the low-pressure fluid outlet when the valve head of said valve member is brought into disengagement from said valve seat,
      (h) a first pressure-energized surface formed on the valve head of said valve member on which fluid pressure produced by fluid flowing from the high-pressure fuel inlet acts to produce a first force urging the valve head of said valve member into disengagement from said valve seat, and
      (i) a second pressure-energized surface formed in said valve member on which fuel pressure within the pressure balancing chamber acts to produce a second force urging the valve head of said valve member into engagement with said valve seat, the second force being substantially equal to the first force;
   (2) an injector body having a spray nozzle for spraying the fuel supplied from the high-pressure fuel inlet;
   (3) a fuel supply passage formed in said injector body which communicates between the high-pressure fuel inlet and the spray nozzle;
   (4) an injector valve member disposed slidably within said injector body;
   (5) injector valve urging means for urging said injector valve member to block fluid communication between said fuel supply passage and the spray nozzle constantly;
   (6) a pressure control chamber defined within said injector body to which a portion of said injector valve member is exposed, said pressure control chamber communicating with the high-pressure fuel inlet and also communicating with the low-pressure fuel outlet through the valve seat of said solenoid-operated valve when the valve head of the valve member is out of engagement with the valve seat of said solenoid-operated valve to produce a change in fuel pressure within said pressure control chamber which acts on the portion of said injector valve member for establishing the communication between said fuel supply passage and the spray nozzle;
   (7) a first fuel flow restricting passage formed between said fuel supply passage and said pressure control chamber; and
   (8) a second fuel flow restricting passage formed between said pressure control chamber and the valve seat of said solenoid-operated valve, a flow area of said second fuel flow restricting passage being greater than that of said first fuel flow restricting passage,
   wherein if the diameter of said first fuel flow restricting passage is defined as $d_1$, the diameter of said second fuel flow restricting passage is defined as $d_2$, a first pressure-energized area of said injector valve member on which the fuel within said pressure control chamber acts in a first direction is defined as $A_Q$, a second pressure-energized area of said injector valve member on which the fuel supplied from said fuel supply passage acts in a second direction opposite the first direction is defined as $A_N$, a minimum required injection pressure of the fuel sprayed from the spray nozzle is defined as $P_{IL}$, and a pressure required for urging said injector valve member so as to establish the communication between said fuel supply passage and the spray nozzle is defined as $P_O$, the following relation is satisfied:

$$d_2/d_1 > (A_Q \times P_{IL} / \{A_N \times (P_{IL} - P_O)\} - 1)^{1/4}$$

2. A fuel injector comprising a fuel injector comprising:
   a fuel injector comprising:
   (1) a solenoid-operated valve including
      (a) a valve body, (b) a valve seat formed within said valve body through which a fluid passage communicating between a high-pressure fuel inlet and a low-pressure fuel outlet extends, (c) a valve member disposed within said valve body movable in a given direction, said valve member having a valve head which selectively engages and disengages said valve seat according to movement of said valve member in the given direction to establish and block fluid communication between the high-pressure fuel inlet and the low-pressure fuel outlet, said valve member having formed therein a chamber, (d) a sliding member disposed within the chamber of said valve member slidably in the given direction to define a pressure balancing chamber, (e) urging means for urging said valve member into constant engagement of the valve head with said valve seat, (f) a solenoid-operated mechanism urging said valve member out of engagement of the valve head with said valve seat against an urging force produced by said urging means to establish the fluid communication between the high-pressure fuel inlet and the low-pressure fuel outlet, (g) a flow restricting passage formed within the valve head, said flow restricting passage constantly communicating between the pressure balancing chamber and the high-pressure fluid inlet and also communicating between the pressure balancing chamber and the low-pressure fluid outlet when the valve head of said valve member is brought into disengagement from said valve seat, (h) a first pressure-energized surface formed on the valve head of said valve member on which fluid pressure produced by fluid flowing from the high-pressure fuel inlet acts to produce a first force urging the valve head of said valve member into disengagement from said valve seat, and (i) a second pressure-energized surface formed in said valve member on which fuel pressure within the pressure balancing chamber acts to produce a second force urging the valve head of said valve member into engagement with said valve seat, the second force being substantially equal to the first force;

(2) an injector body having a spray nozzle for spraying the fuel supplied from the high-pressure fuel inlet;

(3) a fuel supply passage formed in said injector body which communicates between the high-pressure fuel inlet and the spray nozzle;

(4) an injector valve member disposed slidably within said injector body;

(5) injector valve urging means for urging said injector valve member to block fluid communication between said fuel supply passage and the spray nozzle constantly;

(6) a pressure control chamber defined within said injector body to which a portion of said injector valve member is exposed, said pressure control chamber communicating with the high-pressure fuel inlet and also communicating with the low-pressure fuel outlet through the valve seat of said solenoid-operated valve when the valve head of the valve member is out of engagement with the valve seat of said solenoid-operated valve to produce a change in fuel pressure within said pressure control chamber which acts on the portion of said injector valve member for establishing the communication between said fuel supply passage and the spray nozzle;

(7) a first fuel flow restricting passage formed between said fuel supply passage and said pressure control chamber; and (8) a second fuel flow restricting passage formed between said pressure control chamber and the valve seat of said solenoid-operated valve, a flow area of said second fuel flow restricting passage being greater than that of said first fuel flow restricting passage, and further comprising a piston member disposed slidably within said pressure control chamber so as to divide said pressure control chamber into a first and a second pressure chambers, and wherein said first fuel flow restricting passage is formed between said fuel supply passage and the second pressure chamber, and said second fuel flow restricting passage is formed between the first and second pressure chambers.

3. A fuel injector as set forth in claim 2, wherein said second fuel flow restricting passage is formed in said piston member.

4. A fuel injector as set forth in claim 2, further comprising piston urging means for urging said piston member from the first pressure chamber to the second pressure chamber, and wherein when a pressure within the second pressure chamber exceeds that within the first pressure chamber, the piston member is moved so as to increase a volume of the second pressure chamber, while decreasing a volume of the first pressure chamber.

* * * * *